United States Patent [19]

Utner

[11] 4,288,468
[45] Sep. 8, 1981

[54] PROCESS FOR ENCAPSULATING ELECTRICAL COMPONENTS BY VORTEX SINTERING

[75] Inventor: Ferdinand Utner, Regensburg, Fed. Rep. of Germany

[73] Assignee: Siemens Aktiengesellschaft, Berlin & Munich, Fed. Rep. of Germany

[21] Appl. No.: 49,568

[22] Filed: Jun. 18, 1979

[30] Foreign Application Priority Data

Jul. 13, 1978 [DE] Fed. Rep. of Germany ....... 2830893

[51] Int. Cl.³ ............................................. B05D 1/32
[52] U.S. Cl. .................................... 427/45.1; 427/58; 427/185; 427/195; 427/282; 427/300
[58] Field of Search ...................... 427/58, 45, 46, 185, 427/195, 282, 300

[56] References Cited

U.S. PATENT DOCUMENTS

| | | | |
|---|---|---|---|
| 2,844,489 | 7/1958 | Gemmer | 427/185 X |
| 3,226,245 | 12/1965 | Dettling | 427/185 |
| 3,367,789 | 2/1968 | Mommsen | 427/195 X |
| 3,440,078 | 4/1969 | Sharetts | 427/195 X |
| 3,470,010 | 9/1969 | Christiansen | 427/195 X |
| 3,565,664 | 2/1971 | Al | 427/300 X |
| 3,756,852 | 9/1973 | Scheetz et al. | 427/185 X |
| 3,864,798 | 2/1975 | Utner | 29/25.42 |
| 3,875,898 | 4/1975 | Braden | 427/185 |
| 3,884,182 | 5/1975 | Jones | 427/185 X |
| 4,013,807 | 3/1977 | Putney et al. | 427/185 X |

FOREIGN PATENT DOCUMENTS

| | | | |
|---|---|---|---|
| 251780 | 5/1963 | Australia | 427/195 |
| 952479 | 3/1964 | United Kingdom | 427/185 |
| 966519 | 8/1964 | United Kingdom | 427/185 |

Primary Examiner—Shrive P. Beck
Attorney, Agent, or Firm—Hill, Van Santen, Steadman, Chiara & Simpson

[57] ABSTRACT

A process for encapsulating electrical components with a continuous layer of synthetic resin material contemplates induction heating of the component by high frequency current with the component leads covered by heat insulating material, and subjecting the heated component to a vortex bath of synthetic resin powder so as to fuse or sinter the powder to the component. Because the leads have not been heated, no resin is sintered thereto, so that scraping or other removal of resin from the leads to make electrical contact therewith need not be undertaken as an additional step. During hardening of the resin the heat insulation may be left in place on the leads to allow the hardened resin to form "feet" on a base of the component, or the heat insulation may be displaced slightly to allow flow of the hardening resin around the lead without forming a fillet.

4 Claims, 3 Drawing Figures

PROCESS FOR ENCAPSULATING ELECTRICAL COMPONENTS BY VORTEX SINTERING

BACKGROUND OF THE INVENTION

1. Field of the Invention

The present invention relates to a process for encapsulating electrical components by vortex sintering, and in particular an encapsulating process utilizing vortex sintering which leaves the component leads resin-free and prevents formation of fillets.

2. Description of the Prior Art

It is known in the art to encapsulate electrical components by vortex sintering, a process by which the electrical components are heated by induction by a high frequency field, and then subjecting the heated components to synthetic resin powder in a vortex bath to sinter the particles to the heated component. The adhering synthetic may be smoothed by a further heating process.

Processes such as the above known in the art encapsule the entire component, including electrical leads extending therefrom, so that before the leads can be electrically connected, the hardened resin covering the leads must be removed by scraping or other means. In the process of scraping or otherwise removing resin from the leads, the resin in the area where the lead joins the component is likely to be damaged, thereby destroying the moisture seal and frustrating one of the major purposes of such encapsulation. Such unwanted encapsulation of the component leads also results in wasted resin.

Additionally, when the component and the leads are both in encapsulation, a fillet results around the juncture of the lead with the component, which is subject to cracking and breaking when the lead is bent.

SUMMARY OF THE INVENTION

In accordance with the principles of the present invention a process for encapsulating electrical components by vortex sintering prevents encapsulation of the component leads during the vortex sintering, and also prevents the formation of fillets of hardened resin in the area of the junction of the lead wire and the component. This is achieved by covering the component leads with a heat insulating material during the subjection of the component to induction heating in the high frequency field. When the component is encapsulated in the vortex bath, the leads will thus not be heated to a sufficient temperature to sinter resin powder thereto, so that only the body of the component is encapsulated, and the electrical conduction properties of the leads are not impaired.

After the component has passed through the vortex, the sintered resin material is still in somewhat viscous form on the surface of the component, and is to some extent self-smoothing during hardening. If the heat insulating cover on the component lead is retained adjacent the component during the resin cooling period, and removed after the resin has hardened, the resin will have hardened into "feet" on the base of the component disposed on opposite sides of the lead. If the heat insulating covering is moved a slight distance away from the body of the component during the resin cooling period, the resin will flow somewhat to surround the lead and totally encapsulate the body of the component.

The process is particularly suited for covering the leads with strips of paper or synthetic foil having adhesive on one side thereof and which permits a row of components joined by such strips to be encapsulated together, and shipped and sold in quantities still connected by the tape.

It is accordingly an object of the present invention to provide a process for encapsulating electrical components without encapsulating the component leads, so that the components can be electrically connected without further processing after the resin has hardened.

It is another object of the present invention to provide an electrical component encapsulating process which does not form fillets at the junction of the component body and the component lead.

It is a further object of the present invention to provide a process for encapsulating electrical components which can be selectively employed to produce a component having a base with "feet" thereon, or to provide a smooth base.

DESCRIPTION OF THE PREFERRED EMBODIMENTS

Figure 1:
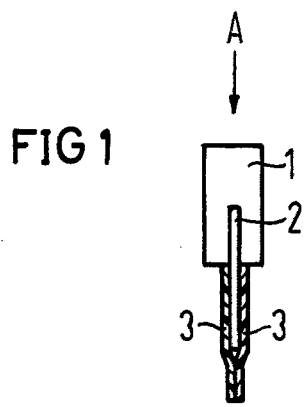
FIG. 1 is a side view, partly in section, of an electrical component to be encapsulated by a process in accordance with the principles of the present invention.

An electrical component 1 to be encapsulated with synthetic resin by vortex sintering is shown in FIG. 1. The component 1 may be a capacitor, resistor, diode or any other small electrical component for which moisture and shock protection is desired. The component 1 has a wire lead 2 extending therefrom, and is to be heated by induction by a high frequency field.

Prior to such heating, the portions of the lead 2 extending beyond the component 1 are covered by two adhesive foil strips 3. The foil strips may be synthetic or paper or any suitable heat insulating material. As shown in FIG. 1, the lead 2 is inserted between the foils 3 by pushing the component 1 in a direction of arrow A until the tops of the foils 3 abut the component 1.

With the lead 2 so protected, the component 1 is subjected to induction heating by a high frequency field and immersion in a vortex bath of synthetic resin powder which is fused to the heated component 1. The synthetic resin may be of any type known in the art possessing suitable moisture imperviousness and material strength.

Figure 2:
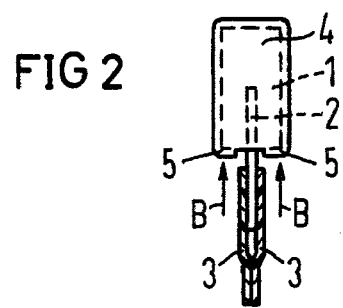
FIG. 2 shows a component encapsulated by a process according to the principles of the present invention in an embodiment for producing feet on the base of the component.

A component 1 after encapsulating is shown in FIG. 2, having a layer of synthetic resin 4 thereon. No such layer forms on the adhesive strips 3, as the strips 3 are not elevated to a temperature sufficient to sinter synthetic powder thereto. Any loose powder adhering to the strips 3 after the component 1 emerges from the vortex bath can be removed, such as by suction or any other suitable means.

After emerging from the vortex bath, the synthetic layer 4 will still be in a slightly viscous form, and will flow on the surface of the component 1 to a slight degree during hardening. The synthetic layer 4 is to this extent self-smoothing, however, a higher degree of smoothing can be achieved if the component is subjected to further heating after the vortex bath. In the embodiment of FIG. 2, the component 1 is lifted or pushed in the directions of arrows B a slight distance away from the tapes 3 after the synthetic layer 4 has substantially hardened. Allowing the tapes 3 to remain adjacent the component 1 during the hardening results in a slight recess in the area of the junction of the lead 2 and the component 1, forming feet 5 on either side of the lead 2. Such feet are helpful in reducing stress to the lead-component junction when the component 1 is soldered to a circuit board. The component 1 can then abut and rest on the circuit board by means of the feet 5, and will thus not be supported on the circuit board solely by means of the component lead 2.

Figure 3:
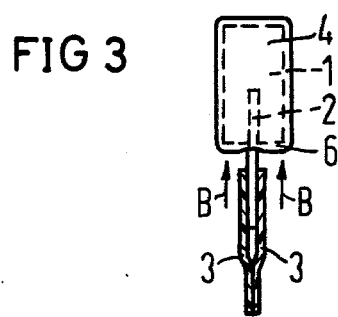
FIG. 3 shows a component encapsulated by a process according to the principles of the present invention in an embodiment for producing a smooth base thereon.

As shown in FIG. 3, the component 1 can be lifted in the direction of the arrows B away from the adhesive strips 3 while the synthetic layer 4 is still hardening. This will allow the synthetic layer 4 to flow slightly around the lead 2, forming a complete encapsulation 6 around the component 1. This method allows the synthetic layer 4 to seal the area around the junction of the lead 2 and the component 1 without forming a fillet. This has the advantage that the component 2 can be bent substantially without putting stress on the synthetic layer 4 which might crack or otherwise damage the layer 4.

In the embodiment of FIG. 3, re-usable clamps may be employed in place of the adhesive strips 3, because no contact with the hardened synthetic layer 4 occurs, allowing re-use of the clamps.

In either of the embodiments shown in FIG. 2 and FIG. 3, a quantity of components 1 can be heated, sintered and cooled in bulk, without removing the adhesive strips 3 or severing the individual components. The quantity can thus be shipped and sold as bulk goods.

Although modifications and changes may be suggested by those skilled in the art it is the intention of the inventor to embody within the patent warranted hereon any changes and modifications as reasonably and properly come within the scope of his contribution to the art.

I claim as my invention:

1. A process for encapsulating electrical components with hardenable casting resin, said components each having wire leads joined to a component body, said process comprising the steps of:
    outwardly bending top edges of a pair of opposed adhesive heat-insulating strips;
    placing a component lead between said strips;
    gluing said strips to said component lead;
    pressing said top edges of the adhesive strips against the lead wires after gluing to cover the lead up to a point at which the lead joins the component body;
    heating the surface said component body by induction in a high frequency field;
    moving the component through a vortex bath of said resin in powder form to sinter the powder to the surface of the component body;
    removing loose resin powder from said insulating material;
    smoothing the sintered resin on the surface of the component body by subjecting the body to further heat to melt the resin; and
    allowing the sintered resin to harden.

2. The process of claim 1 including the additional step of removing said insulating material at least from an area of said lead adjacent said body after sintering and before said resin has hardened.

3. The process of claim 1 including the step of removing said insulating strips at least from an area of said lead adjacent said body after the smoothing step and before allowing the sintered resin to harden.

4. The process of claim 1 wherein the step of moving the component through a vortex bath is further defined by gripping said adhesive strips with a gripping means, suspending said component from said gripped adhesive strips, and moving said gripping means with said component through said vortex bath.

* * * * *